(12) United States Patent
Comalander (10) Patent No.: US 11,371,628 B2
(45) Date of Patent: Jun. 28, 2022

(54) PIPE SUPPORT SYSTEM HAVING ADJUSTABLE STAND, AND METHOD OF USE

(71) Applicant: Comalander Fabrication and Services, LLC, Beaumont, TX (US)

(72) Inventor: Christopher R. Comalander, Beaumont, TX (US)

(73) Assignee: Comalander Fabrication and Services, LLC, Beaumont, TX (US)

( * ) Notice: Subject to any disclaimer, the term of this patent is extended or adjusted under 35 U.S.C. 154(b) by 0 days.

(21) Appl. No.: 17/337,050

(22) Filed: Jun. 2, 2021

(65) Prior Publication Data

US 2021/0293357 A1    Sep. 23, 2021

Related U.S. Application Data

(60) Division of application No. 16/566,938, filed on Sep. 11, 2019, which is a continuation-in-part of application No. 29/695,338, filed on Jun. 18, 2019, now Pat. No. Des. 946,127.

(60) Provisional application No. 62/837,610, filed on Apr. 23, 2019, provisional application No. 62/829,903, filed on Apr. 5, 2019.

(51) Int. Cl.
*F16L 3/01* (2006.01)

(52) U.S. Cl.
CPC ..................... *F16L 3/01* (2013.01)

(58) Field of Classification Search
CPC ............... F16L 3/01; F16L 3/00; F16K 27/00

USPC ....................................... 138/178; 248/218.4
See application file for complete search history.

(56) References Cited

U.S. PATENT DOCUMENTS

| | | | | |
|---|---|---|---|---|
| 4,662,034 A | * | 5/1987 | Cunningham | A44B 1/28 24/94 |
| 5,110,073 A | * | 5/1992 | Schoenky | F16L 3/02 248/70 |
| 5,924,469 A | * | 7/1999 | Whittemore | E04G 21/30 248/200.1 |
| 9,714,726 B1 | * | 7/2017 | Laidley | F16L 3/223 |
| 2011/0215566 A1 | * | 9/2011 | Stempo | F16L 27/0808 285/146.1 |
| 2017/0102097 A1 | * | 4/2017 | Walston | F16B 1/00 |
| 2019/0285105 A1 | * | 9/2019 | Wiley | F16B 13/124 |
| 2020/0318760 A1 | * | 10/2020 | Comalander | F16L 3/18 |
| 2020/0332922 A1 | * | 10/2020 | Comalander | F16K 27/00 |

* cited by examiner

*Primary Examiner* — Muhammad Ijaz
(74) *Attorney, Agent, or Firm* — Peter L. Brewer; Thrive IP (57) ABSTRACT

A pipe support system includes a pipe base, a threaded bolt having a head, a deck supported above the pipe base, and a cap removably resting on the upper surface of the deck. Methods for installing the pipe support system include determining a height of a joint of pipe or pipe component above a ground surface; selecting a length of the pipe base in accordance with the height of the joint of pipe or pipe component above the ground surface; slidably placing the bolt into an inner diameter of the pipe base until a flanged housing is landed onto a top of the pipe base; rotating the head of the bolt relative to the pipe base in order to provide micro-adjustments to the height of the deck relative to the pipe base; and placing the joint of pipe or other pipe component onto the cap, thereby supporting the pipe component above the surface.

13 Claims, 9 Drawing Sheets

PIPE SUPPORT SYSTEM HAVING ADJUSTABLE STAND, AND METHOD OF USE

CROSS REFERENCE TO RELATED APPLICATIONS

This application is filed as Divisional of U.S. Ser. No. 16/566,938. That application was filed on Sep. 11, 2019, and is entitled "Pipe Support System Having Adjustable Stand, and Method of Use."

The parent application was filed as a Continuation-In-Part of U.S. Ser. No. 29/695,338 filed Jun. 18, 2019. That application is entitled "Platform and Insert for a Pipe Support System" and is incorporated herein in its entirety by reference.

The parent application also claims the benefit of U.S. Ser. No. 62/829,903 filed Apr. 5, 2019. That application is entitled "Pipe Support Stand Having Saddle, and Method of Use" and is also incorporated herein in its entirety by reference.

The parent is application further claims the benefit of U.S. Ser. No. 62/837,610 filed Apr. 23, 2019. That application is entitled "Pipe Support System Having Adjustable Stand, and Method of Use" and is also incorporated herein in its entirety by reference.

STATEMENT REGARDING FEDERALLY SPONSORED RESEARCH OR DEVELOPMENT

Not applicable.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

FIELD OF THE INVENTION

The present invention relates generally to support structures used for holding joints or sections of pipe or related pipe components above a ground surface. More specifically, the invention relates to a pipe support system that is adjustable so as to accommodate pipes and related components having varied heights above a ground surface, or to compensate for uneven surfaces along the ground.

TECHNOLOGY IN THE FIELD OF THE INVENTION

Pipeline transport involves the transportation of fluids. Such fluids may include brine, potable water or sewage. Such fluids may also include unrefined liquid hydrocarbons, hydrocarbons in gaseous state, refined hydrocarbons, or components separated from produced hydrocarbons such as sulfuric components and carbon dioxide.

Pipelines are made up of a series of pipe joints connected end to end. In many cases, pipelines are installed above ground. Such elevated pipelines are frequently supported by a series of stanchions (also known as pipe support stands) that are spaced apart along a length of the pipeline. These stanchions rise from the ground to support the pipeline a predetermined distance above the surface. Frequently, the distance is only one to three feet.

During use, the pipe joints along a pipeline will experience fluctuations in temperature. This is due to a combination of changes in ambient outdoor temperature and changes in the temperature of the fluids being transported. Temperature fluctuations will inevitably cause portions of the pipeline to expand and contract. Some temperature fluctuations will occur abruptly, for example, over a matter of hours. This may occur due to short term changes in weather or due to the 24-hour solar cycle. Other changes may occur over longer periods of time, for example, due to changes in season or changes in fluid composition within the pipe.

The temperature fluctuations experienced along a pipeline are typically non-uniform across the length of the pipeline. This leads to a situation where some portions of the pipeline will expand or contract to a greater degree than other portions. The effects of thermal expansion and contraction on a pipeline will often be most pronounced along sections of pipe that periodically flow relatively hot or cold fluids.

Thermal expansion and contraction causes a pipeline to extend or retract in axial length. This, in turn, causes frictional wear as the pipeline rubs against the pipe support structure. Pipeline stanchions may incorporate lower-friction bearing surfaces that permit the overlying pipeline to slide relative to the stanchion. Beneficially, this can reduce the occurrence of bending, buckling, and jumping caused by an expanding or contracting pipe joint. For example, a pair of aluminum or polished stainless steel plates may be welded to the bottom of a pipe shoe and the top of a pipe stanchion, to face one another during use and to permit relative angular movement as well as axial movement between the stanchion and pipeline. In other examples, one of the plates may be replaced with a ceramic or a polytetrafluoroethylene (PTFE) plate.

As part of providing support to a pipeline above a ground surface, it is also sometimes necessary to support flanges, valves and other pipeline components. These components are used to control the flow of fluids through the pipeline. Support structures for such components may also include a bearing surface.

It is necessary to monitor the condition of pipe support structures to ensure that the bearing surfaces are in good condition not only to support a pipe section but also to accommodate thermal expansion/contraction. Unfortunately, replacing bearing plates is time consuming and expensive. Further, each pipe component may require a unique height to be supported above the ground. In this respect, flanges and valves do not always have the same dimensions. Thus, it may be necessary to adjust the position of the pipe component relative to the ground to at least a small extent.

Therefore, a need exists for an improved pipe support system for holding a pipeline component above a ground surface, wherein the bearing plate can be easily installed, and then later can be easily removed and replaced. A need further exists for a pipe support system that may be adjusted so as to accommodate height above the ground for pipeline components or sections of a pipeline. Still further, a need exists for a pipe support structure that allows for relative longitudinal movement of a pipeline component (such as a valve or a flange) once it is set onto the pipe support structure. In addition, a need exists for an improved method of replacing a worn bearing plate beneath a pipe component.

BRIEF SUMMARY OF THE INVENTION

A pipe support system is first provided herein. In one aspect, the pipe support system first comprises a pipe base.

The pipe base preferably comprises a base plate, and a tubular body supported vertically by the base plate. The tubular body may have a circular cross-section or a polygonal cross-section. In either instance, the tubular body has a defined length chosen for supporting a pipe or pipe component a selected distance above a ground surface.

In one aspect, the pipe support system comprises a plurality of tubular bodies, with each tubular body having a different length. This allows the operator to select a tubular body with a desired length, thereby making macro-adjustments to the height of a joint of pipe or related pipe component above a supporting surface.

The pipe support system also includes a deck. The deck defines a substantially flat body configured to receive a pipeline component. The pipeline component may be, for example, a joint of pipe, a pipe collar, a valve or a flange. The deck is dimensioned to provide axial support for the pipeline component.

The pipe support system also includes an adjustable stud assembly. In one embodiment, the stud assembly includes a stud and a flanged housing. The stud comprises a non-threaded head, and a threaded bolt below the head. The bolt is threadedly received within a central opening of the flanged housing.

The flanged housing is in the form of a nut, but has a flanged outer surface. The flanged housing (or "stud housing") is configured to land in and to mate with an inner diameter of the tubular body. At the same time, the flanged outer surface is dimensioned to gravitationally land onto an upper end of the tubular body.

Rotation of the bolt relative to the flanged housing adjusts a relative position of the non-threaded head over the flanged housing. Stated another way the bolt (or stud) is able to rotate relative to the tubular body, creating axial movement of the head. When a pipe component is placed onto the deck, this allows for micro-adjustments to the height of the pipe component above the supporting surface.

Nested along an upper surface of the deck is a cap. The cap likewise defines a substantially flat body and also provides gravitational support for a joint of pipe or a related pipeline component. In one embodiment, the cap includes downwardly facing shoulders on opposing sides of the cap. The shoulders are dimensioned to straddle the sides of the deck. In this way, the cap will not slide off of the deck in response to thermal expansion or contraction along the pipeline.

Preferably, the cap comprises a plurality of longitudinal channels. The channels wick away water, such as from rain fall or condensation, preventing water from ponding along the pipeline component.

Finally, the pipe support structure comprises a receptacle. The receptacle resides below the deck and is configured to gravitationally reside on a collar associated with the stud. The receptacle has a circular inner diameter, and the collar comprises a circular body dimensioned to serve as a bearing surface for the receptacle. This allows the bolt to rotate independent of the deck, providing micro-adjustments to the height of the deck and supported pipe component) over the tubular body.

One or more keys may extend through the receptacle to engage the stud. This rotationally locks the stud to the deck, causing the bolt, the flanged housing and the deck to rotate together. Of course, the key(s) may be removed so that micro-adjustments may be made to the height of the deck above the ground surface before or after the joint of pipe or related pipeline component is installed.

A method of supporting a section of pipe or related pipeline component is also provided herein. In one embodiment, the method first comprises providing a pipe support system. The pipe support system may be in accordance with the pipe support system described above in its various embodiments. For example, the pipe support system may include:

a vertical pipe base;
a stud assembly having a flanged housing and a non-threaded head, wherein the flanged housing includes an opening configured to threadedly receive a threaded bolt extending down from the head;
a deck supported above the pipe base, the deck having an upper surface and a receptacle along a lower surface for gravitationally landing over the non-threaded head; and
a cap removably placed along the upper surface of the deck.

The method also includes determining a desired height for a joint of pipe or related pipeline component above a ground surface. Additionally, the method comprises selecting a length of the pipe base in accordance with the desired height of the joint of pipe or pipe component above the ground surface. In this way, a macro-adjustment may be made to the height of the support system.

In one aspect, the pipe base defines a vertically-oriented tubular body supported by a base plate. The method may then comprise selecting a tubular body having a desired length for supporting the joint of pipe, section of pipeline, or related pipeline component the desired height above the ground surface.

The method further includes slidably placing the stud assembly into an inner diameter of the pipe base. Specifically, the flanged housing and connected stud are landed onto a top of a tubular body associated with the pipe base. Further, the method includes landing the receptacle of the deck onto the collar of the stud. In this way, the deck and cap are supported above the pipe base.

It is noted that rotation of the bolt relative to the flanged housing adjusts a relative position of the non-threaded head over the flanged housing This allows the method to include rotating the head of the bolt relative to the pipe base in order to provide micro-adjustments to the height of the deck relative to the flanged housing once the flanged housing is landed onto the pipe base. Then, the method comprises placing the joint of pipe or pipe component onto the cap, thereby supporting the pipe component above the ground surface. The pipe component may again be a joint of pipe, a pipe collar, a valve or a flange.

Optionally, a key is provided to place the deck and the bolt in fixed axial relation. This provides for fixed rotational relation. When the key is not provided, the stud is able to rotate to make micro-adjustments to the height of the supported joint of pipe or related pipeline component even after the joint of pipe or related pipeline component is landed on the cap of the deck.

In a preferred arrangement of the method, the deck defines a substantially flat body configured to receive the joint of pipe or other pipeline component. The deck provides gravitational support. The pipe support structure further comprises the cap nested along or removably attached to the deck. The cap likewise defines a substantially flat body to support any shape of a joint of pipe or other pipe component.

In one embodiment, the cap includes downwardly facing shoulders on opposing sides of the concave cap. The shoulders are dimensioned to straddle opposing flat edges of the deck. In this way, the cap will not slide off in response to thermal expansion or contraction of the pipeline. The method then comprises placing the cap onto the deck prior to the step of landing a joint of pipe, a section of pipeline, or related pipeline component onto the cap.

The cap serves as a bearing surface, supporting the pipeline or a pipe component. Over time, the cap will become worn. The method then further comprises replacing the worn cap with a new cap.

DESCRIPTION OF THE DRAWINGS

So that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF SELECTED SPECIFIC EMBODIMENTS

Figure 1A:
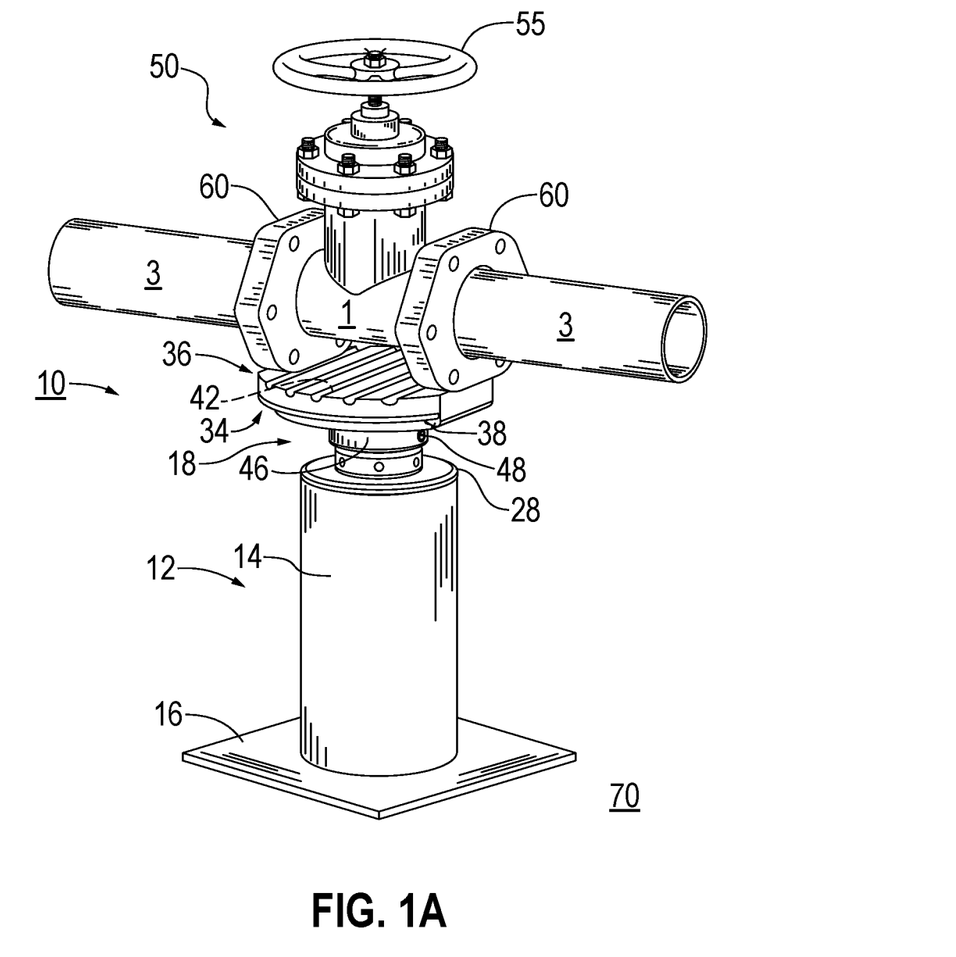
FIG. 1A is a perspective view of the pipe support system of the present invention, in one embodiment. Here, the pipe support system is supporting a valve placed in series along a pipeline.
Figure 1B:
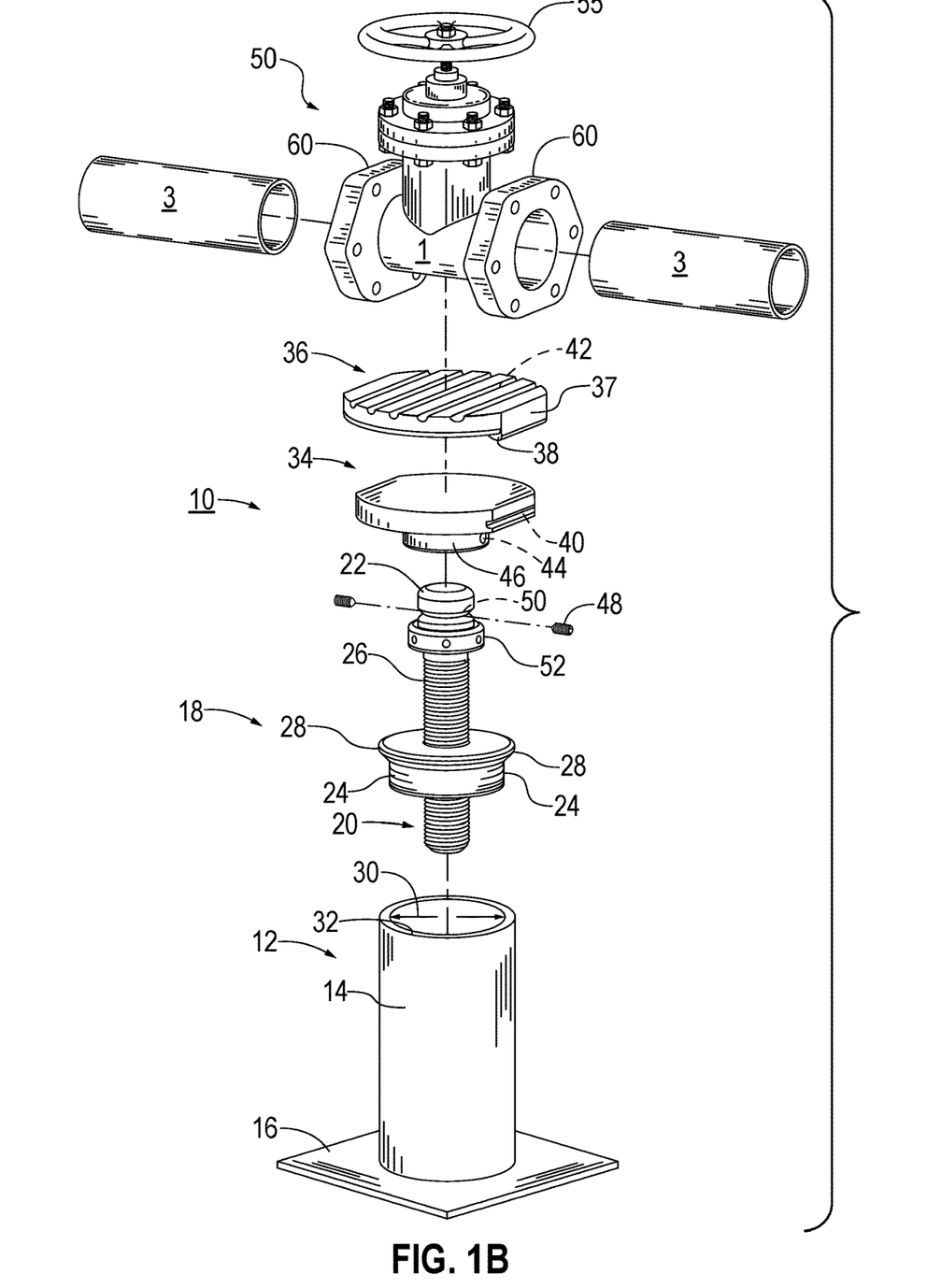
FIG. 1B is another perspective view of the pipe support system as in FIG. 1A. Here, parts of the pipe support system are shown in exploded-apart relation.

Certain novel characteristics of embodiments of the present application are set forth in the appended claims. However, the embodiments themselves and further objectives and advantages thereof, will best be understood by reference to the following detailed description when read in conjunction with the accompanying drawings, wherein:

FIG. 1A is a perspective view of a pipe support system 10 of the present invention, in one embodiment. FIG. 1B is another perspective view of the pipe support system 10. Here, parts of the pipe support system 10 are shown in exploded-apart relation for illustrative purposes. The pipe support system 10 will be generally described with reference to FIGS. 1A and 1B together.

The pipe support system 10 first includes a pipe base 12. The pipe base 12 preferably defines a tubular body 14 supported by a base plate 16. The tubular body 14 may have a circular cross-section or a polygonal cross-section. In either instance, the tubular body 14 has a defined length chosen for supporting a pipeline component 1 at a selected distance above a ground surface 70.

Generally speaking, the pipeline component 1 may be a joint or a section of pipe. Alternatively or in addition, the pipeline component may be a flange, a valve, or other tool placed in-line along or teed off of a pipeline. In the view of FIGS. 1A and 1B, the pipeline component 1 includes a valve 50 with a pair of opposing flanges 60. The valve 50 includes a so-called handwheel 55 used for manually opening and closing the valve 50. Rotation of the handwheel 55 will translate a stem and connected disc (or "seat" not shown) along a bonnet. Extending away from the flanges 60 are joints of pipe 3.

As noted, the pipeline component 1 is supported by a pipe base 12. The tubular body 14 of the pipe base 12 is vertically oriented and extends up from the base plate 16. In one aspect, the pipe support system 10 comprises a plurality of tubular bodies 14, with each tubular body 14 having a different length. This allows the operator to select a tubular body 14 with a desired length, thereby making macro-adjustments to the height of the pipe component 1 above the ground surface 70.

The pipe support system 10 additionally includes an adjustable stud assembly 18. In one embodiment, the stud assembly 18 includes an adjustable stud 20, which may be a threaded bolt having a head 22, and a stud housing 24. The stud 20 (with threaded portion 26) is threadedly received within the stud housing 24. Preferably, the stud housing 24 is in the form of a nut, but with a flanged outer surface 28. As shown, the stud housing 24 is configured to land in and to mate with an inner diameter 30 of the tubular body 14. At the same time, the flanged outer surface 28 is dimensioned to land onto an upper end 32 of the tubular body 14.

In the exemplary arrangement of FIGS. 1A and 1B, the pipe component 1 is supported by a deck 34. The deck 34, in turn, is covered by a removable cap 36. A snap-lock feature or projection, such as one or more tabs 38, is formed on or attached to the removable cap 36 on opposing sides 37. The tabs 38 may be used to slide or snap into channels or ridges such as tracks 40 of the deck 34 to secure the cap 36 to the deck 34. Those skilled in the art will appreciate and understand that the arrangement of the rails 38 and tracks 40 can be reversed and are not limited to the example shown.

In one aspect, the cap 36 snaps onto the deck 34 using the tabs 38 as a snap-lock feature. In another aspect, the cap 36 slides onto the deck 34 by sliding the tabs 38 into the tracks 40. In either instance, it is preferred that the opposing sides 37 of the cap 36 with tabs 38 face a longitudinal axis of the supported pipeline upon installation.

As also shown, the cap 36 may include ducts, or channels 42. The channels 42 are configured to receive water, such as rain water, that may accumulate on the pipe support system 10. The channels 42 are configured to prevent moisture from pooling between the deck 34 and point bearing surfaces of the pipe component 1. Preferably, the channels 42 are aligned in parallel relation, and have a high point along a center line enabling gravitational run-off of water.

Potentially, the channels 42 of the cap 36 serve to create a lower coefficient of friction to accommodate movement of the pipe component 1 resting thereon, particularly during expansion and contraction of the pipe component 1 during ambient temperature changes or changes resulting from fluid flow within the pipe component 1. The cap 36 may be constructed of polycarbonate or metal materials according to local environmental conditions or intended usages.

In a preferred arrangement, the cap 36 is fabricated from a polyurethane or a synthetic thermoplastic linear polyamide (or nylon). Nylon is preferred as it offers a combination of high strength and relatively low friction. One suitable example of a nylon material is Nylatron® GSM, available from Quadrant EPP USA Inc. of Reading, Pa. Nylatron® GSM contains finely divided particles of molybdenum disulphide ($MoS_2$) to enhance load bearing capabilities while maintaining the impact resistance inherent to nylon. Other Nylatron® products may also be considered. However, it is preferred that whatever plastic or other material is used, it should have UV stabilizers.

The deck 34 and its connected cap 36 are designed to gravitationally reside on or over the head 22 of the stud assembly 18. To accommodate this, a receptacle 46 is provided on a lower end of the deck 34. The receptacle 46 defines an inner diameter dimensioned to closely receive the head 22. Preferably, a perimeter of the receptacle 46 lands on a collar 52 positioned above the threaded portion 26 (or bolt) of the stud 20.

The pipe support system 10 is also designed so that the deck 34 (and connected cap 36) may be selectively locked to the stud assembly 18. In this way, the deck 34 will not rotate relative to the bolt 26. As shown in FIG. 1B, set screw apertures 44 are formed in the receptacle 46 of the deck 34. In addition, one or more set screws or keys 48 may extend into and through the apertures 44 to engage the non-threaded head 22 of the stud assembly 18. In one aspect, the non-threaded head 22 has a concentric groove 55 (seen in FIG. 2B) to receive the set screws 48. When the set screws 48 are in place, the deck 34 and the stud assembly 18 are configured to rotate together. It will be appreciated that although two set screws 48 are shown to press-fit against areas of the concentric groove 55, a single set screw 48 or additional set screws 48 may be utilized, and the concentric groove 55 in the head 22 may be distinct receptacles or apertures for receiving respective set screws 48.

Figure 1C:
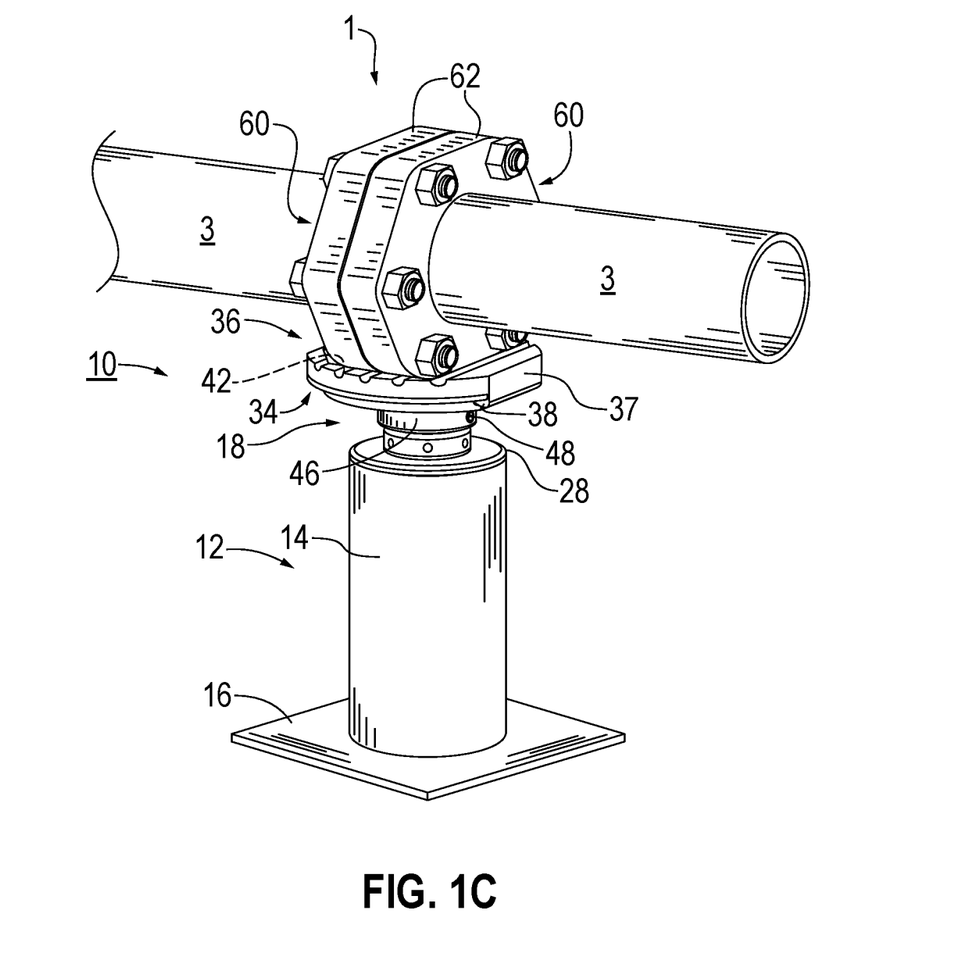
FIG. 1C is a perspective view of the pipe support system of the present invention, similar to the embodiment in FIG. 1A. Here, the pipe support system is supporting flanges serving as pipe connectors.

FIG. 1C presents another perspective view of the pipe support system 10 of the present invention. This is the same embodiment as is shown in FIGS. 1A and 1B. However, in this view an alternative pipe component is shown. Specifically, the pipe component is a pair of flanges 60, but without a valve.

It can be seen that the flanges 60 include flat edges 62. A flat edge of each flange 60 is resting on the cap 36. The cap 36 is dimensioned to support the flanges above a ground surface.

It understood that in lieu of flanges 60, the pipe component 1 may be a single valve, an elbow, a pipe joint collar, or other component. The pipe support system 10 may be used to support any pipeline component which requires elevation above ground 70 to prevent corrosion. The present inventions are not limited by the type of pipe or related components employed. The pipeline components 1 may be part of a pipeline used to convey fluids such as produced water, crude oil, brine, potable water, sewage or hydrocarbon gases. Produced hydrocarbons may be transported from the field into a gathering facility, a treatment facility or a refinery using the pipe components 1 and the pipes 3. Processed fluids also may be transported from a treatment facility or a refinery using the pipe components 1 and the pipes 3.

Figure 2A:
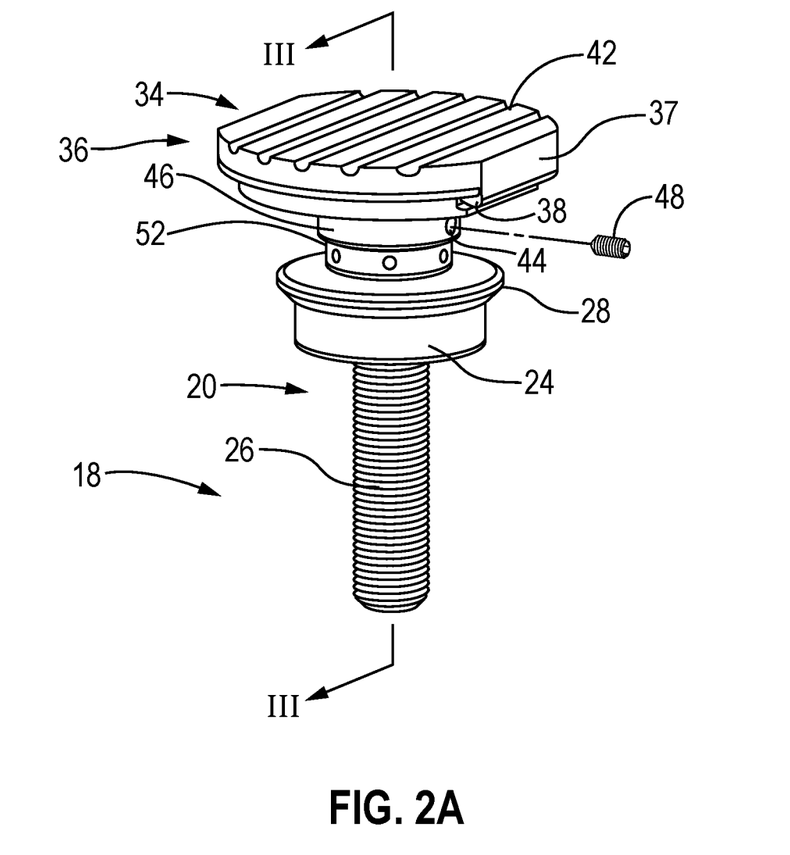
FIG. 2A is an enlarged perspective view of the adjustable stud assembly of the present invention, in one embodiment. The stud assembly is shown supporting a deck and cap as in FIGS. 1A-1C.
Figure 2B:
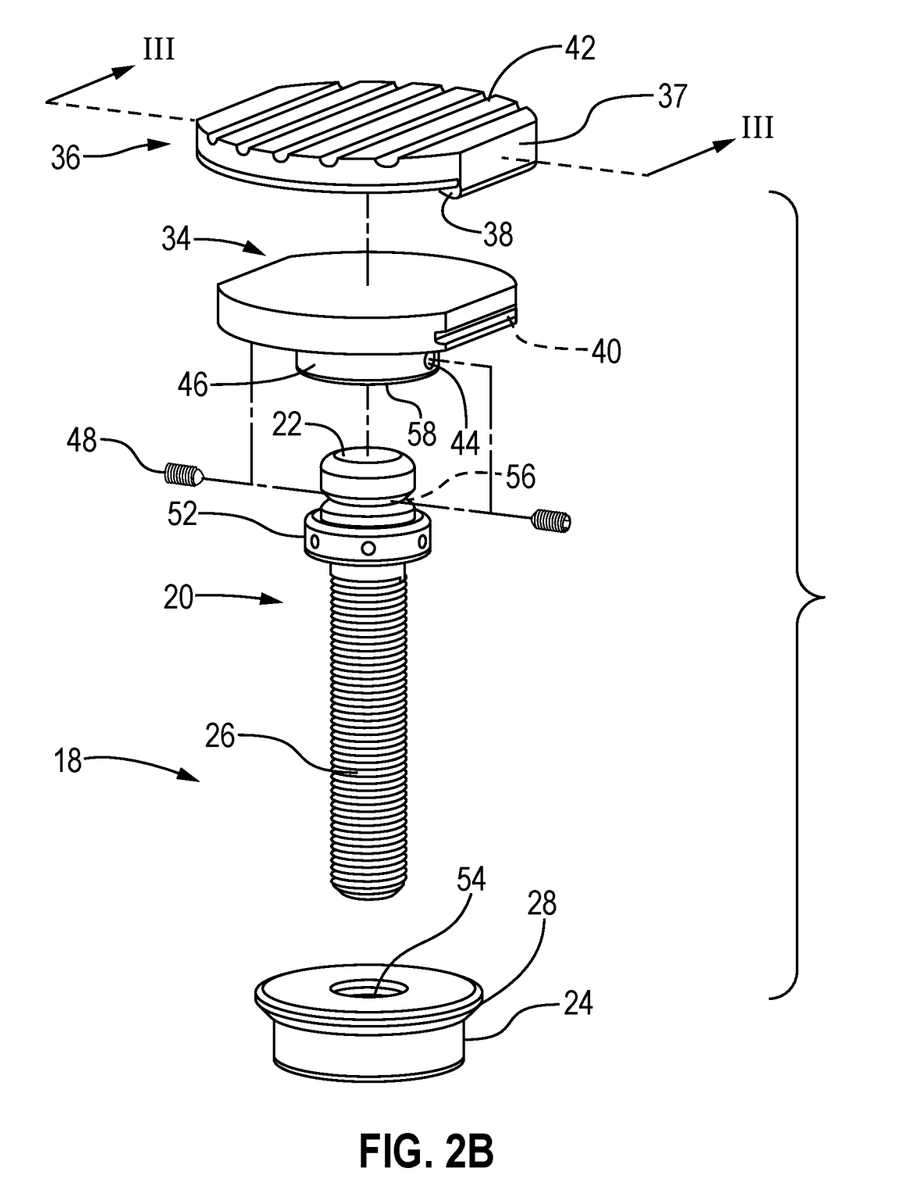
FIG. 2B is another perspective view of the pipe support system as in FIG. 1B. In this view, a bolt and stud housing (together forming the stud assembly) are shown in exploded-apart relation. Also seen are the exemplary deck and cap.

Turning now to FIGS. 2A and 2B, enlarged perspective views of the adjustable stud assembly 18 are shown. The stud assembly 18 includes the stud 20 with its non-threaded head 22 and threaded bolt 26. The assembly 18 also includes the adjustable stud housing 24. In FIG. 2B, the stud 20 with its threads 26 is most clearly shown with a collar 52 and the stud housing 24 with its flanged outer surface 28 in exploded-apart relation. Here also, complementary threads 54 are shown in the stud housing 24 for receiving the threads 26 of the stud 20.

Figure 3:
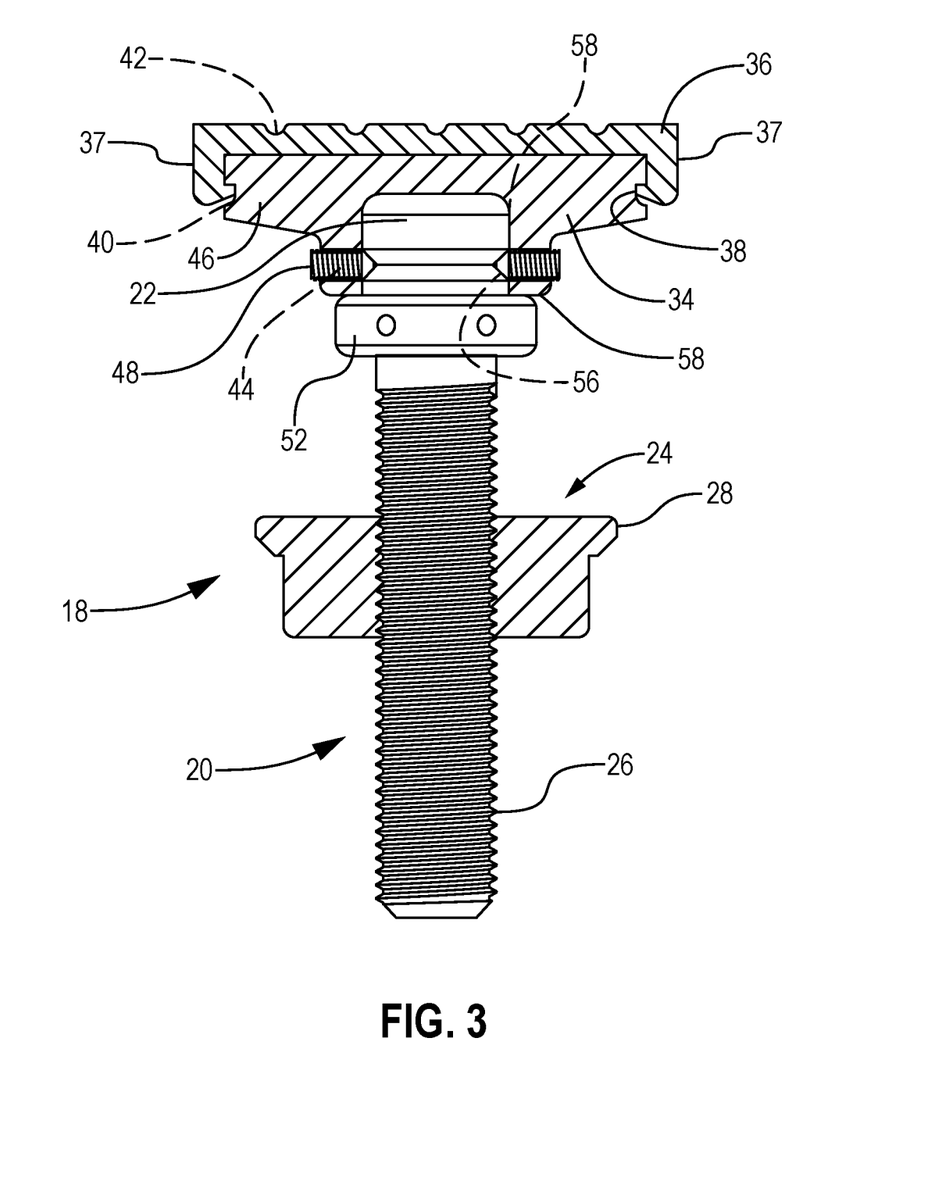
FIG. 3 is an enlarged front elevational view of the head of the bolt mated with a partial cross-sectional view of the deck and cap taken along lines of FIG. 2A. Specifically, the receptacle has landed on a collar, which serves as a bearing surface.

With reference to FIGS. 2B and 3, the collar 52 is shown separating the head 22 from the thread portion 26, or bolt. The receptacle 46 has actually landed on the collar 52. More specifically, a shoulder or perimeter 58 around the receptacle 46 has landed onto the collar such that the collar 52 serves as a bearing surface for the receptacle 46. The receptacle has a circular inner diameter, and the non-threaded head 22 comprises a circular or spherical body dimensioned to support the receptacle 46.

FIG. 3 further shows in cross section an operation of the rails 38 of the cap 36, which in this example are slidably engaged in tracks 40 of the deck 34 to secure the cap 36 to the deck 34. In this way, the cap 36 will not slide off in response to thermal expansion or contraction of components resting on the cap 36 or in reaction to expansion or contraction of indirectly connected components along a pipeline. Also shown most clearly in FIG. 3 are the channels 42 of the cap 36 upon which pipe components 1 as in FIGS. 1A and 1C may be seated. The deck 34 and the cap 36 preferably together provide full radial and axial support to accommodate a wide variety of pipe components 1 having various types of point bearing surfaces and shapes.

Also shown in FIG. 3, when the key 48 is removed, the stud 20 and the collar 52 may rotate independent from the deck 34 and the cap 36. In this way, micro-adjustments (following selection of a macro length of the tubular body 14) may further be made to the height of the deck 34 and the cap 36 above the ground surface.

Figure 4:
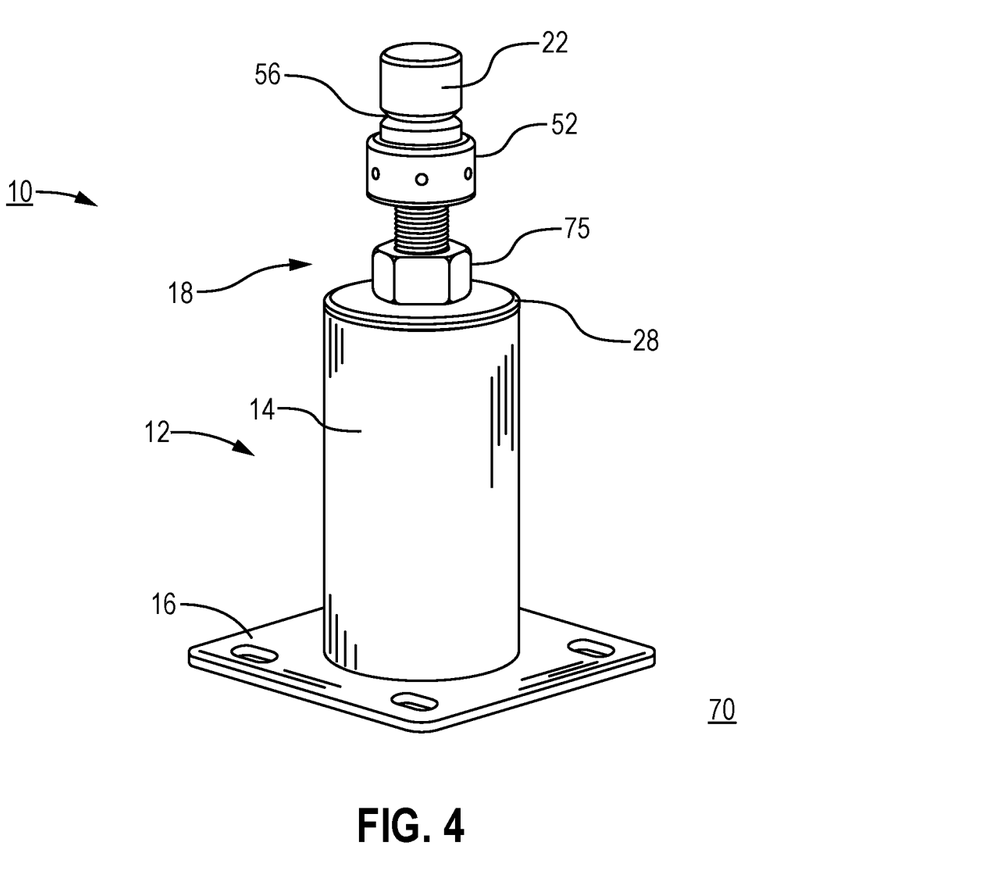
FIG. 4 is a perspective view of the pipe support system as in FIG. 1A, in an alternate embodiment. In this view, the deck, the cap and the pipe components have been removed. A nut has been placed along the threaded stud, locked on top of the stud housing.

FIG. 4 is a perspective view of the pipe support system 10 as in FIG. 1A, in an alternate embodiment. In this view the deck 40, the cap 36 and the pipe components (pipes 3, valve 50 handwheel 55, and flanges 60) have been removed for illustrative purposes. It can be seen that a nut 75 has been placed along the threaded portion 26 of the stud 20. The nut 75 has been tightened down (or locked) on top of the stud housing 24. Beneficially, the optional nut 75 prevents the stud 20 from being able to raise or lower over time once it is set to elevation, such as in response to vibrations emanating from the pipeline 3 or from nearby pumps or processing equipment (not shown).

Figure 5A:
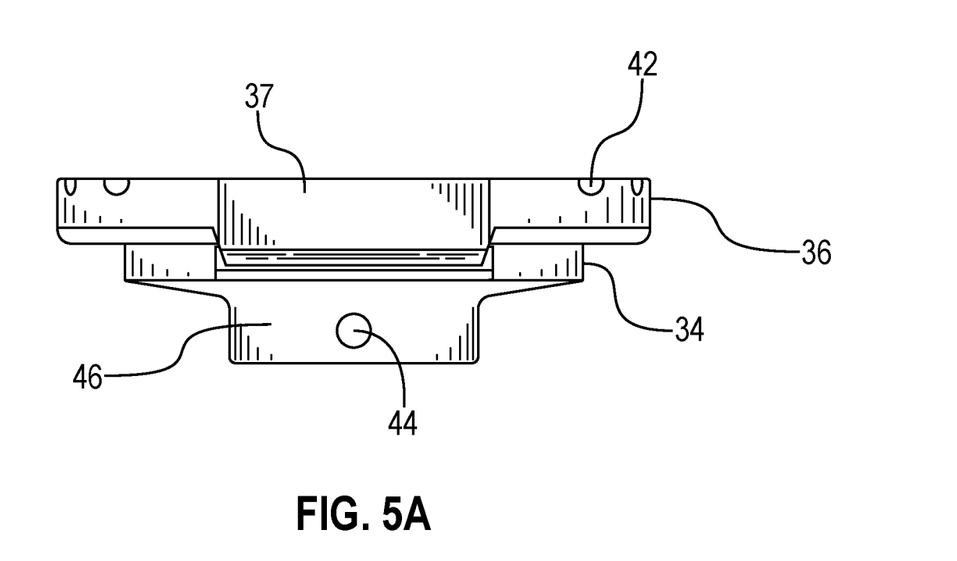
FIG. 5A is a side elevation view of the deck and cap of the pipe support system of FIGS. 1A and 1B. The view is taken from the front, with a set screw aperture visible.

FIG. 5A is a side elevation view of the deck 34 and the cap 36 of the pipe support system 10 of FIGS. 1A and 1B. The view is taken from the front, with a set screw aperture 44 visible.

Figure 5B:
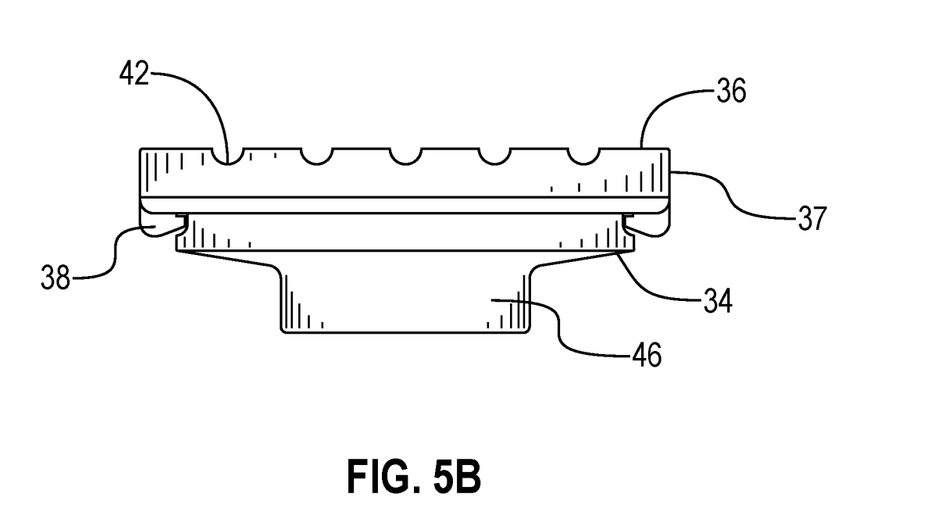
FIG. 5B is another side view of the deck and cap of FIG. 5A. Here, the components have been rotated 90°.

FIG. 5B is another side view of the deck 34 and cap 36 of FIG. 5A. Here, the components have been rotated 90°.

Figure 6A:
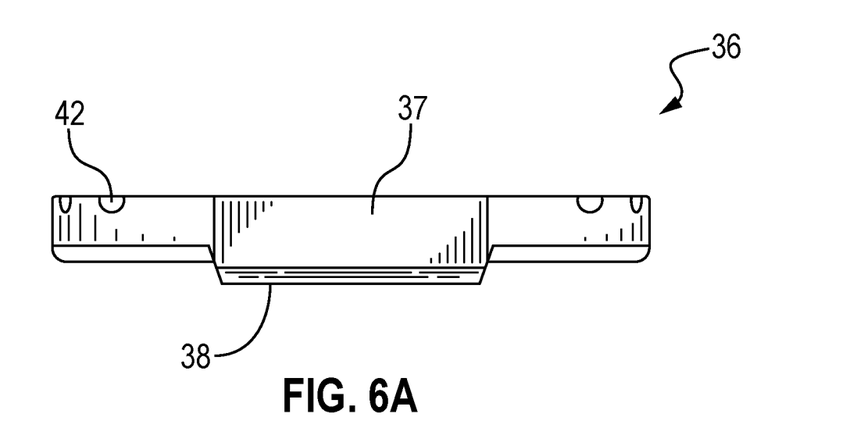
FIG. 6A is a side elevation view of the replaceable cap of the pipe support system of FIGS. 1A and 1B. This is a front view, with a flat shoulder facing the reader.

FIG. 6A is a side elevation view of the replaceable cap 36 of the pipe support system 10 of FIGS. 1A and 1B. This is a front view, with a flat shoulder 37 facing the reader.

Figure 6B:
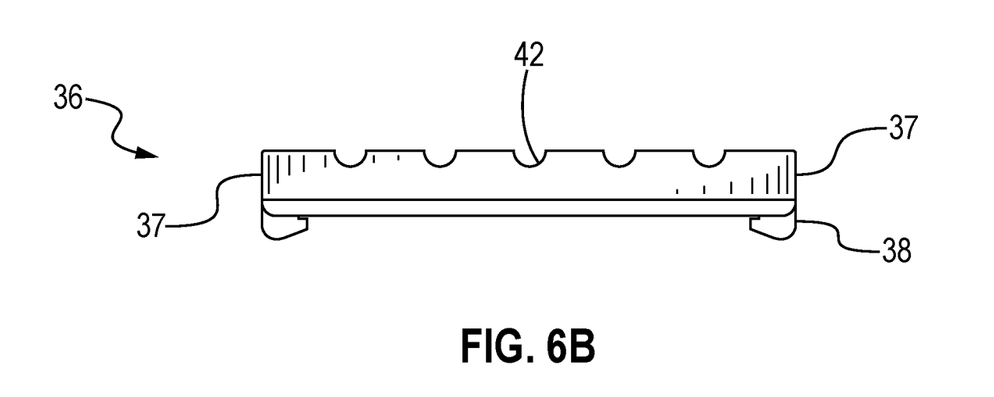
FIG. 6B is front elevation view of the cap of FIG. 6A.

FIG. 6B is front elevation view of the cap 36 of FIG. 6A. A plurality of parallel channels 42 are visible in FIG. 6B.

Using the pipe support system 10 described above, a method of supporting a section of pipe or related pipe components is also provided herein. In one embodiment, the method first comprises providing a pipe support system. The pipe support system may be in accordance with the pipe support system 10 described above in its various embodiments. For example, the pipe support system may include:
- a pipe base comprising a vertically-positioned tubular body;
- a stud assembly having (i) a stud comprising a non-threaded head and a threaded bolt, and (ii) a flanged housing;
- a deck supported above the pipe base, the deck having a substantially flat upper surface and a receptacle along a lower surface for gravitationally landing on or over the head; and
- a cap removably nested or resting on the upper surface of the deck.

In a preferred arrangement of the pipe support system 10, the deck defines a substantially flat body configured to support the pipe or related pipe component. The deck provides gravitational support. The pipe support structure further comprises a cap resting on the deck. The cap likewise defines a substantially flat body, which may include channels for wicking away rainfall or condensation.

The method also includes determining a height of a joint of pipe or pipeline component to be supported above a ground surface. Additionally, the method comprises selecting a length of the vertically-oriented tubular body in accordance with the height of the pipe or pipe component above the ground surface. It is understood here that in the present disclosure, the term "ground surface" includes any supporting surface such as a concrete pad or a metal platform.

The method further includes slidably placing the bolt into an inner diameter of the tubular body. Preferably, the bolt is part of a stud assembly. In this instance, the stud assembly is inserted until the flanged housing and is landed onto a top of the tubular body. Further, the method includes landing the receptacle of the deck over the head of the bolt so that the deck and nested cap are gravitationally supported above the pipe base. Preferably, the stud assembly includes a collar below the head of the bolt, and the receptacle lands on the collar.

The method also includes rotating the threaded bolt relative to the pipe base (or more specifically, relative to the flanged housing) in order to provide micro-adjustments to the height of the deck relative to the pipe base. Then, the method comprises placing the joint of pipe or other pipe component onto the cap, thereby supporting the pipe component above the ground surface.

Optionally, a key is provided to place the deck and the bolt in fixed axial relation. The key is run through apertures in the receptacle of the deck until it contacts the head of the bolt (or more specifically, an annular groove below the head). When the key is not provided, the bolt is able to rotate to make micro-adjustments to the height of the supported pipe or pipe component even after the pipe or component is landed on the cap.

Optionally, a nut is placed along the threaded portion of the bolt. The nut resides between the head of the bolt and the flanged housing. The nut is turned until it is locked down on top of the flanged housing. This prevents the flanged housing from inadvertently turning relative to the threaded bolt (and the deck and cap) in response to environmental vibrations.

In one embodiment, the cap includes downwardly facing shoulders on opposing sides of the cap. The shoulders are dimensioned to straddle the deck and preferably engage tracks within the deck. In this way, the cap will not slide off in response to thermal expansion or contraction along the pipeline. The method then comprises placing the cap onto the deck prior to the step of landing a joint of pipe, a section of pipeline, or other pipe component onto the cap. Ideally, the opposing flat sides are positioned transverse to the longitudinal axis of the supported pipeline.

In one aspect, the vertically-oriented tubular body is supported by a base plate. The method may further comprise selecting a tubular body having a desired length for supporting the pipe or related component above the base plate. The base plate, in turn, preferably resides along a ground surface.

After a period of time, the cap (as the bearing plate) will experience wear. Accordingly, a method of replacing a bearing plate (or cap) for a pipe support structure is also provided herein. In one aspect, the method first comprises providing a pipe support system. The pipe support system is structured in accordance with the pipe support system 10 described above in its various embodiments. The system includes a pipe base, a deck, a cap resting on the deck, and a stud assembly for adjustably supporting the deck and cap over the pipe base.

The stud assembly comprises (i) a non-threaded head and a threaded bolt, and (ii) a flanged housing comprising a flange, and an opening through the flange configured to threadedly receive the bolt, wherein rotation of the bolt relative to the flanged housing adjusts a relative position of the non-threaded head over the flanged housing. The stud assembly allows the operator to make micro-adjustments to the height of the cap over the ground surface when the deck and cap are landed onto the stud assembly.

Upon discovering that the cap has become worn, the method includes removing the cap from the deck. This may be done by:
- rotating the bolt relative to the flanged housing in a first direction, thereby lowering the stud assembly, the deck and the supported cap away from the joint of pipe or other pipeline component;
- replacing the cap with a new cap; and
- rotating the bolt relative to the flanged housing in a second opposite direction, thereby raising the stud assembly, the deck and the cap, and placing the cap into supporting engagement with the joint of pipe or pipe component.

Replacing the cap with a new cap may comprise pulling, sliding or snapping the cap off of the deck. Of interest, rotating the rotatable stud may be done without the deck and nested cap also rotating.

The method may further include providing a groove or key in the non-threaded head of the stud. Alternatively, the groove or key may be formed in the deck to receive the non-threaded head of the stud. In any event, the arrangement will laterally and axially lock the head in place.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application.

In the claims which follow, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

I claim:

1. A method of supporting a pipeline component, comprising:
   providing a pipe support system, comprising:
   a base plate,
   a pipe base comprising a vertically-oriented tubular body supported by and extending up from the base plate;
   a stud assembly having (i) a stud comprising a non-threaded head and a threaded bolt, and (ii) a flanged housing comprising a flange, with an opening through the flanged housing configured to threadedly receive the bolt;
   a deck supported above the pipe base, the deck having an upper surface and a receptacle; and
   a cap removably attached to or nested on the upper surface of the deck;
   determining a height of a the pipeline component to be supported above a surface;
   slidably placing the bolt onto an inner diameter of the tubular body until the flanged housing is landed onto a top of the tubular body;
   landing the receptacle of the deck over the head of the stud so that the deck and cap are supported above the pipe base;
   rotating the head of the bolt relative to the flanged housing in order to provide micro-adjustments to the height of the deck and cap over the pipe base; and
   placing the pipeline component onto the cap, thereby supporting the pipeline component above a ground surface according to the determined height.

2. The method of claim 1, further comprising:
   selecting a length of the tubular body in accordance with the determined height of the pipeline component to be supported above the ground surface.

3. The method of claim 1, further comprising:
   using a key, locking the head in the receptacle to prevent relative rotational movement of the bolt and the deck.

4. The method of claim 3, wherein:
   the receptacle comprises an aperture for threadedly receiving the key;
   locking the head comprises threadedly placing the key through the aperture and into engagement with the stud;
   the stud assembly further comprises (iii) a collar residing between the non-threaded head and the threaded bolt; and
   landing the receptacle of the deck over the head of the stud comprises landing the receptacle onto the collar, thereby allowing the pipe base and stud assembly to support the deck and cap.

5. The method of claim 1, wherein the pipeline component comprises a flange, a valve, an elbow joint or a section of pipe.

6. The method of claim 1, wherein:
   the stud assembly further comprises (iv) a nut placed along a threaded portion of the bolt, residing between the non-threaded head and the flanged housing; and
   the method further comprises tightening the nut down on the flanged housing after the micro-adjustments have been made.

7. A method of replacing a cap for a pipe support structure, comprising:
   providing a pipe support system, comprising
   a pipe base comprising a vertically-oriented tubular body;
   a stud assembly having (i) a threaded bolt comprising a non-threaded head, and (ii) a flanged housing comprising a flange, and an opening through the flanged housing configured to threadedly receive the bolt;
   a deck supported above the pipe base, the deck having an upper surface and a receptacle along a lower surface configured to be gravitationally landed over the head;
   a cap resting on the upper surface of the deck, the deck and cap supporting a joint of pipe or pipe component over the pipe base;
   after a period of time, observing that the cap has become worn; and removing the worn cap from the deck by:
   rotating the stud relative to the flanged housing in a first direction, thereby lowering the bolt, the deck and the supported cap away from the joint of pipe or pipe component;
   replacing the worn cap with a new cap; and
   rotating the bolt relative to the flanged housing a second opposite direction, thereby raising the bolt, the deck and the new cap into engagement with the joint of pipe or pipe component.

8. The method of claim 7, wherein the deck remains stationary while the bolt is rotated.

9. The method of claim 7, wherein:
   the stud assembly further comprises (iii) a collar residing between the non-threaded head and the threaded bolt; and
   the receptacle of the deck gravitationally and removably resides on the collar, thereby allowing the pipe base and stud assembly to support the deck and cap as a bearing surface.

10. The method of claim 7, wherein the cap includes channels disposed thereon, the channels being configured to wick away moisture from below the pipeline component.

11. The method of claim 7, further comprising:
    using a key, locking the head in the receptacle to prevent relative rotational movement of the bolt and the deck.

12. The method of claim 11, wherein:
    the receptacle comprises an aperture for threadedly receiving the key; and
    locking the head comprises threadedly placing the key through the aperture and into engagement with the head of the bolt.

13. The method of claim 12, wherein:
    the new cap is fabricated from a non-conductive material.

* * * * *